US006093896A

United States Patent [19]

Wu et al.

[11] Patent Number: 6,093,896

[45] Date of Patent: Jul. 25, 2000

[54] BATTERY CELL BYPASS SWITCH

[76] Inventors: Jui-Yu Wu; Matthew B. Dalton, both of 750 W. Ventura Blvd., Camarillo, Calif. 93010

[21] Appl. No.: 09/286,579

[22] Filed: Apr. 5, 1999

[51] Int. Cl.[7] .......................... H01H 35/00; H01H 37/74; H01M 14/00

[52] U.S. Cl. .......................... 200/52 R; 307/10.7; 337/1; 429/7

[58] Field of Search .............................. 429/7; 200/52 R, 200/61.08, 61.45 R, 61.53, 16 B, 16 E; 337/1, 5, 6, 7, 407, 408, 409; 307/10.7

[56] References Cited

U.S. PATENT DOCUMENTS 5,438,173 8/1995 Rudoy et al. .......................... 200/52 R

*Primary Examiner*—J. R. Scott
*Attorney, Agent, or Firm*—George J. Netter

[57] ABSTRACT

A system (10) for establishing bypass of a failed battery cell (18) includes a failed cell sensor (26) which on sensing a failed cell generates an electric signal that destroys clamping relation of two retaining wire spools (24) to release retaining means (14,16). Such release enables a unitary plunger assembly (28) to be moved by a spring (49) to position a cylindrical pin contact (52) in electrical shorting relation to the first and second electrodes (57,58) connected across the cell (18).

10 Claims, 2 Drawing Sheets

BATTERY CELL BYPASS SWITCH

BACKGROUND

1. Background of the Invention

The present invention relates generally to a serial array of battery cells used in aerospace applications, and particularly to a system for shorting around or bypassing one of the cells in the serial array when it has failed thereby providing a continuous electrical battery circuit despite failure of one or more of the battery cells.

2. Description of Related Art

U.S. Pat. No. 5,438,173, CELL BYPASS SWITCH, by Edward Rudoy and Leslie Kerek, assigned to the same assignee as the present application, relates generally to a cell bypass switch including a sensor for determining when a given battery has failed. This results in an alternate current path being established around the failed battery cell thereby permitting the remainder of the battery cells to continue their function. More specifically, the patented bypass switch includes a pair of collapsible collet fingers connected to an electrical pin contact which is positioned on the axis of a pair of socket contacts. Upon the withdrawal of two spring-loaded plungers, the collapsible fingers of the collet member pass through an elongated narrow channel resulting in the release of an electrical pin contact. At this time, the pin contact provides electrical continuity with the socket contacts to form an electrical circuit bypassing the failed cell. Although the patented device operates to provide the desired cell array operation, it can be improved especially as to reliability. First of all, part of the patented apparatus includes a pair of springs (37) for operation which would be more reliable if replaced by a single spring. Similarly, whereas the patented device includes a pair of plungers (36) and (136) which are individually operated, replacement with a single plunger assembly substantially reduces the possibility of apparatus failure.

SUMMARY OF THE INVENTION

In accordance with the practice of the present invention there is provided a system for establishing an automatic bypass of a failed battery cell interconnected in a series connected battery array. On a cell of the array failing, a sensor of that failed condition produces an electric signal which burns off one or both link wires allowing the release of the remaining wire. When this occurs, the spool halves are then free to seprate by means of the spring loaded plunger driving them apart. When this occurs, a pair of commonly held plunger arms integral with a plunger base are released and moved by a single spring from a first position ("armed") to a second position ("fired"). By this motion, a shorting member has moved from the disconnect relation to a position shorting around or bypassing the failed cell. The entire operation is rapidly achieved with maximum reliability.

BRIEF DESCRIPTION OF THE DRAWING

These and other objects and advantages of the present invention will become more readily apparent upon reading the following detailed description and upon reference to the attached drawings, in which.

DESCRIPTION OF A PREFERRED EMBODIMENT

Figure 1:
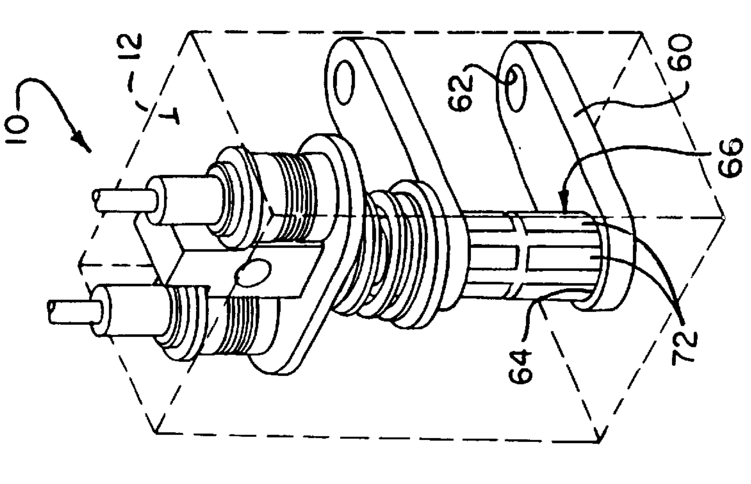
FIG. 1 is a perspective view of the system of the present invention.

Turning now to the drawings, and particularly FIG. 1, the cell bypassing system of the present invention is shown enumerated generally as 10 and is seen to include a generally parallelepiped housing 12 within which the system parts are contained. Although other materials may be advantageously employed, the housing is preferably constructed of polyetherether ketone (PEEK) which is generally electrically non-conductive and has been found to possess higher temperature resistance than, say, teflon (which have been used for this purpose in the cited U.S. Pat. No. 5,438,173).

In what is the upper end portion shown in FIGS. 2 and 3, there are located first and second retaining means 14 and 16 which, as will be described, maintain the entire system 10 when in an "armed" MODE so as not to interfere with the normal electrical operation of the battery cell array, one cell of which array is shown and enumerated as 18. Since the retaining means 14 and 16 are identical, only means 14 will be described. Briefly, each retaining means includes a pair of separable half-shells 19 and 20 which when held together provide an access opening 22 for receiving and retaining a part therein. These two mating half-shells are held together in armed mode by a coil 24 of spring wire the ends of which are physically held together by an electrically destructible wire loop (not shown). When a battery cell failure sensor 26 determines that a cell has failed, the sensor provides an electric signal to the wire loop destroying it which serves to release the coil 24 of spring wire from restraining relation and in that way allowing the two half-shells to separate. As will be shown later in detail, separation of the half-shells transfers the apparatus from the armed mode to the fired mode.

Suitable first and second retaining means 14 and 16 can be purchased from the assignee of the present application, which means are sold under the trade designation G & H 8500 NEI. These NEI's (Non-Explosive-Initiators), on receiving an energizing signal pass an actuating signal through retainer loop or link wire to destroy it which allows the retainer coil springs to unwind as a result of their inherent spring characteristics to a larger diameter and release the half-shells from one another.

Figure 5:
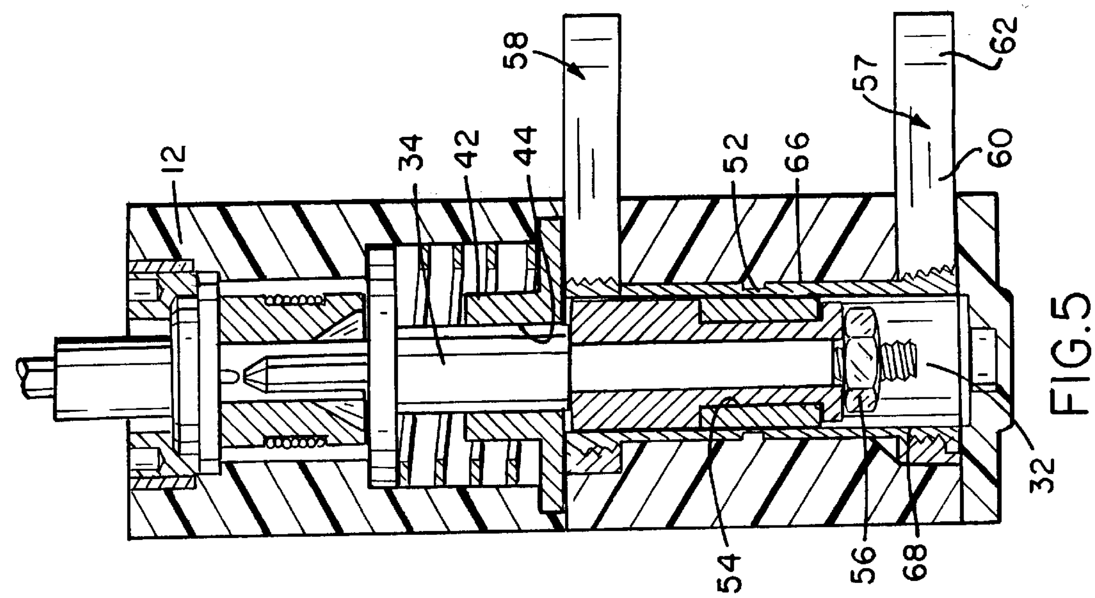
FIG. 5 is a further elevational sectional view similar to FIG. 3 shown in fired mode.
Figure 4:
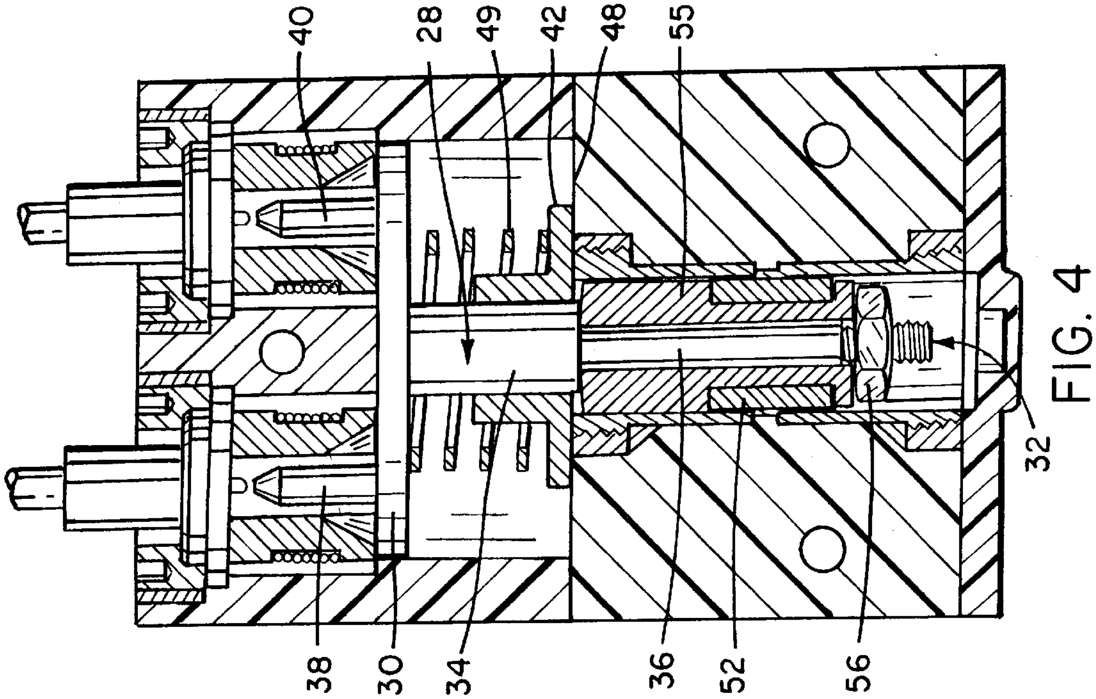
FIG. 4 is an elevational sectional view similar to FIG. 2 showing the system in fired mode.

Turning now to FIGS. 4 and 5, a unitary plunger assembly 28 is seen to include a cylindrical plate 30 with an axially located rod member 32 extending normally away from one major surface of the plate. The rod member has a first relatively large cross-section portion 34 adjacent the plate and a second lesser cross-section portion 36 extending axially outwardly away from the first portion 34. From the other major surface of the plate 30 there are first and second upstanding positioning rods 38 and 40 extending normally away from the plate opposite to the direction of the rod member 32.

A journal 42 is positionally fixed within the housing 12 at a central location and maintained with its central bore 44 in a vertical position as shown in FIG. 5. The dimensions of the bore 44 are such as to receive the first relatively large cross-section portion 34 of the rod member 32 sliding therein so that the plunger, when received within the journal, can be readily moved in the direction of the arrows 46 (FIG. 2). The lower end of the journal includes an enlarged cylindrical flange 48 with a downwardly facing flat surface.

A compression spring 49 is received about the relatively large cross-sectional portion 34 of the rod member 32 with one force exerting end bearing against the upper flat surface of the flange 48 and the opposite force exerting end contacting the plate 30. The spring mechanism may be any compressible member known in the art (e.g. coil spring) which serves to continuously and resiliently force the plate 30 and thus the entire plunger assembly 28 upwardly toward the first and second retaining means 14 and 16. Although a conventional coil spring can be employed for use as the spring means 49, it is preferable that a plurality of stacked Belleville springs be used, which provide the reaction spring characteristics desirable for accomplishing the designated function.

A cylindrical pin contact 52 constructed of a good electrical conductor material has a central bore 54 of such dimensions and geometry as to enable sliding receipt onto a cylindrical insulator 55 which, in turn, is received on the second lesser cross-section portion 36 of the rod member 32 and affixed thereto by a nut 56. The pin contact is so located that it can be positioned in a lowermost position ("armed") where it only contacts a first electrode 57 and can be translated upwardly to a second position where the pin contact is in electrical contacting relation to both the first electrode 57 as well as a second electrode 58.

Figure 3:
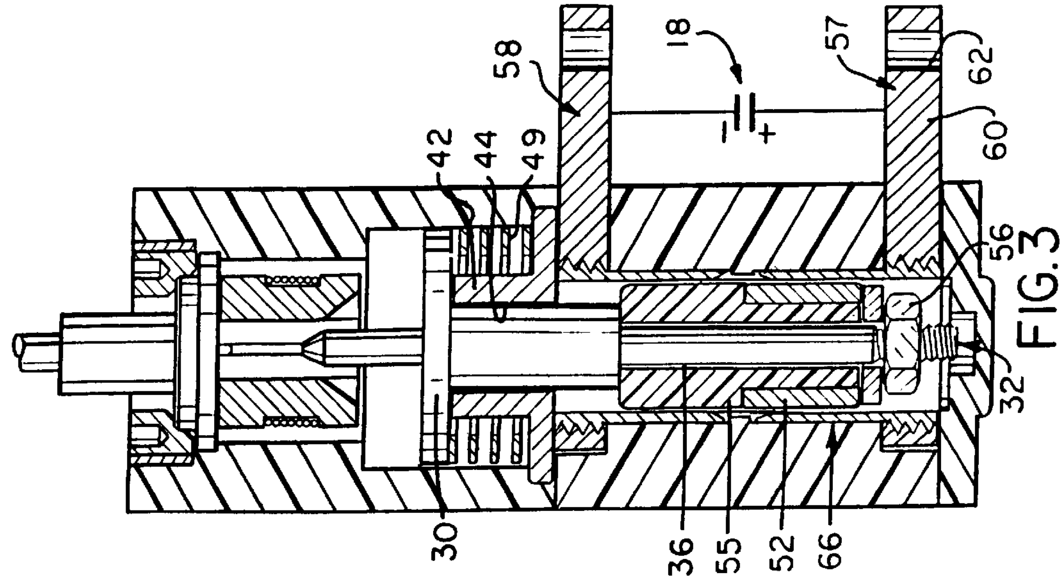
FIG. 3 is a further elevational sectional view taken at 90 degrees to FIG. 2.

As shown in FIG. 3, the two electrodes 57 and 58 are interconnected, respectively, to the two output terminals of the failed cell 18 and in this way when the apparatus is in "fired" mode the pin contact 52 serves to provide the alternate shorting path or conducting path around the failed cell, thereby maintaining the remainder of the cell array in operation.

In accordance with the following description of the detailed construction of electrodes 57 and 58 reference is made particularly to FIGS. 1, 4 and 5. Since the two electrodes are identical, only electrode 57 will be described in detail. Specifically, the electrode 57 includes an elongated connection arm 60 having an opening 62 adjacent the arm outer end for use in establishing electrical interconnection with a battery cell. Adjacent the other arm end is a further opening 64 which is threaded. A hollow cylindrical metallic sleeve contact 66 has a threaded end portion 68 for threaded receipt within the opening 64. A resilient cylindrical sidewall 70 is formed from a plurality of splines 72, each having an end integral with the end portion 68 and which splines extend away from the end portion 68 in a common direction parallel to one another. By this construction, the splines 72 resiliently maintain good contact with the outer surface of the pin contact 52.

Figure 2:
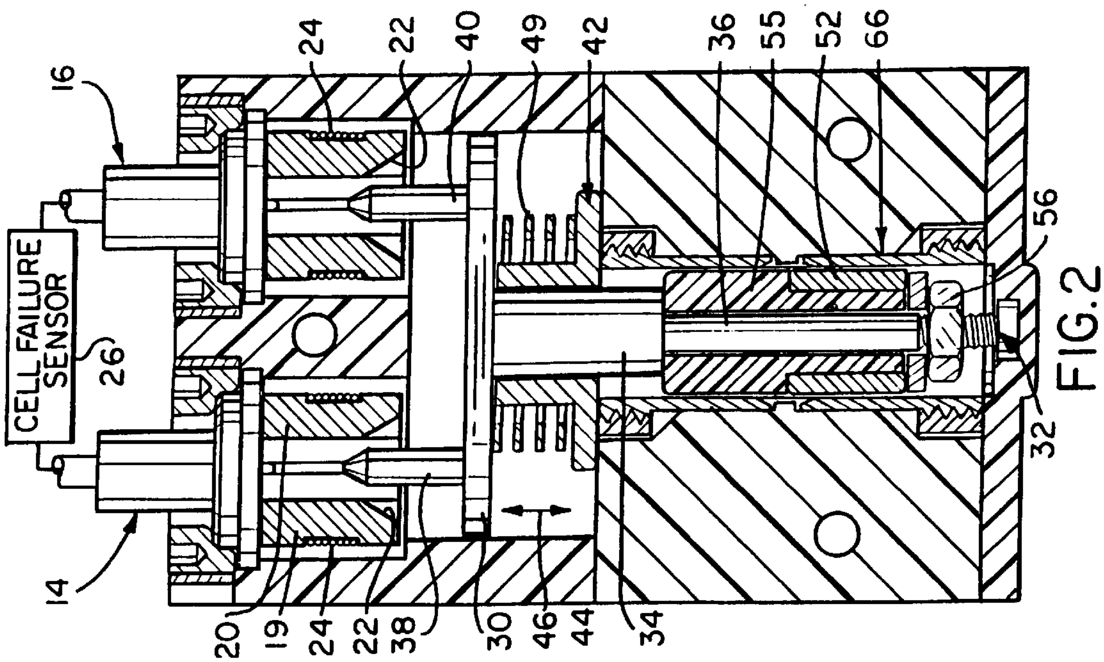
FIG. 2 is an elevational sectional view of the system of the invention shown in the armed mode.

For the ensuing discussion of operation of the invention, reference is now made to FIGS. 2 and 3. As shown there, in the armed position the upper ends of the positioning rods 38 and 40 are received within the respective hollow access openings 22 of the first and second retaining means which are of such construction as to prevent the rods from passing therethrough. When the sensor 26 detects that the cell 18 has failed, an electric signal is sent to each of the first and second retaining means 14 and 16 which, as was described earlier, releases the respective spring wire coils 24 and 26 causing each pair of half-shells 19 and 20 to separate. Now, the plunger 28, which is free to move under the reaction of the spring means 49, moves upwardly with the positioning rods 38 and 40 passing through the enlarged openings 22 (FIGS. 3 and 4) which are now presented to them between the respective half-shells. With this movement, the pin contact 52 moves upwardly as shown in FIG. 4 to provide a shorting relation across the two electrodes 57 and 58 permitting the entire battery array to continue operation as before with the failed cell 18 bypassed. All of this action is accomplished in milliseconds and with the utmost reliability.

Although the present invention is described in connection with a preferred embodiment, it is to be understood that those skilled in the art may contemplate changes which come within the spirit of the invention as described herein and within the ambit of the appended claims.

What is claimed as:

1. In a system for providing an alternate circuit around a failed electrical battery cell including a sensor providing an electrical signal on the battery cell failing, first and second retaining means actuatable by the electrical signal to change an access opening from a first relatively small obstructing size to a second relatively large non-obstructing size, comprising:

- a one-piece plunger including a plate, first and second positioning rods unitarily secured to one major surface of the plate with respective outer end portions received within the access openings, and a rod member secured to the other major side of the plate;
- spring means resiliently urging the plunger toward the access opening;
- a pin contact affixed to the rod member and movable therewith from a first position to a second position; and
- first and second spaced apart electrodes connected respectively to the failed cell terminals and located along the path of movement of the rod member such that when said rod member is in its first position the pin contact solely contacts the first electrode and when in the second position contacts both the first and second electrodes.

2. A system as in claim 1, in which the spring means includes a plurality of stacked Belleville washer springs.

3. A system as in claim 2, in which the plate first and second positioning rods, and rod member are moved as a unit by the stacked Belleville washers on the access openings of both first and second retaining means assuming their respective second non-obstructing size.

4. A system as in claim 2, in which the plate first and second positioning rods and the rod member all move in a common first direction to place the system in an "armed" mode where the first and second retaining means access opening are each in obstructing size and are moved in a common second direction when the system is in "fired" mode.

5. A system as in claim 1, in which said system is enclosed in a housing constructed of polyeterether ketone.

6. A system as in claim 1, in which the first and second positioning rods are located on the plate at points respectively equidistant from the axes of the rod member.

7. A system as in claim 6, in which the plate is elongated along a first direction and relatively narrow transversely to said first direction, and respective center lines of the rod member and positioning rods lying in a common plane and parallel to one another.

8. A system as in claim 1, in which each electrode includes a connection arm having first and second openings therein, said second opening being threaded; a sleeve contact with a threaded end portion threaded within the connection arm second opening, and a transveresely resilient sleeve wall which has a bore within which the pin contact is received.

9. A system as in claim 8, in which the sleeve wall is constructed of a plurality of splines each having one end integral with the threaded end portion and the remainder of the splines extended away from the threaded end portion in a common direction, said splines being generally parallel to one another.

10. A redundant system for shorting around a failed electrical battery cell electrically interconnected with at least one other active electrical battery cell, comprising:

first and second retaining means both impulsable by a common electrical signal to a non-retaining state:

a unitary plunger assembly including, (a) an elongated plate having first and second opposite major surfaces, (b) first and second generally cylindrical positioning rods extending away from the plate first major surface and having outer end portions respectively retained by the first and second retaining means;

(c) a generally cylindrical rod member extending away from the plate second major surface, the cylindrical axis of the rod member lying between the axes of the first and second positioning rods;

a journal including a passage therethrough of such dimensions as to sliding receipt of the plunger rod member therein;

a plurality of Belleville springs received about the plunger rod member resiliently compelling the plunger plate and positioning rods away from the journal toward the first and second retaining means; and a generally cylindrical metal contact secured to the rod member for being moved into shorting relation across terminals of a failed cell on the retaining means existing in a non-retaining state.

* * * * *